United States Patent
Maharana et al.

(10) Patent No.: US 11,836,380 B2
(45) Date of Patent: *Dec. 5, 2023

(54) NVME DIRECT VIRTUALIZATION WITH CONFIGURABLE STORAGE

(71) Applicant: Micron Technology, Inc., Boise, ID (US)

(72) Inventors: Parag R. Maharana, Dublin, CA (US); Anirban Ray, Santa Clara, CA (US); Gurpreet Anand, Pleasanton, CA (US); Samir Rajadnya, San Jose, CA (US); Paul Stonelake, Santa Clara, CA (US); Samir Mittal, Palo Alto, CA (US)

(73) Assignee: Micron Technology, Inc., Boise, ID (US)

(*) Notice: Subject to any disclaimer, the term of this patent is extended or adjusted under 35 U.S.C. 154(b) by 100 days.

This patent is subject to a terminal disclaimer.

(21) Appl. No.: 17/304,522

(22) Filed: Jun. 22, 2021

(65) Prior Publication Data

US 2021/0311665 A1 Oct. 7, 2021

Related U.S. Application Data

(63) Continuation of application No. 16/355,271, filed on Mar. 15, 2019, now Pat. No. 11,068,203.

(Continued)

(51) Int. Cl.
*G06F 3/06* (2006.01)
*G06F 13/42* (2006.01)
*G06F 13/16* (2006.01)

(52) U.S. Cl.
CPC .......... *G06F 3/0659* (2013.01); *G06F 3/0604* (2013.01); *G06F 3/0622* (2013.01);
(Continued)

(58) Field of Classification Search
CPC .... G06F 3/0659; G06F 3/0604; G06F 3/0622; G06F 3/0688; G06F 3/0626;
(Continued)

(56) References Cited

U.S. PATENT DOCUMENTS

| 9,501,245 B2 | 11/2016 | Hussain et al. |
| 2009/0133028 A1* | 5/2009 | Brown ................ G06F 9/45558 718/104 |

(Continued)

FOREIGN PATENT DOCUMENTS

| KR | 20130000253 A | 1/2013 |
| KR | 20170013713 A | 2/2017 |
| WO | 2016196766 A2 | 12/2016 |

OTHER PUBLICATIONS

J. Suzuki, Y. Hidaka, J. Higuchi, Y. Hayashi, M. Kan and T. Yoshikawa, "Disaggregation and Sharing of I/O Devices in Cloud Data Centers," in IEEE Transactions on Computers, vol. 65, No. 10, pp. 3013-3026, Oct. 1, 2016, doi: 10.1109/TC.2015.2513759. (Year: 2016).*

(Continued)

*Primary Examiner* — Khoa D Doan
(74) *Attorney, Agent, or Firm* — Lowenstein Sandler LLP

(57) ABSTRACT

A processing device, operatively coupled with one or more memory devices, is configured to provide a plurality of virtual memory controllers, partition one or more memory devices into a plurality of physical partitions, and associate each of the plurality of virtual memory controllers with one of the plurality of physical partitions. The processing device further provides a plurality of physical functions, wherein each of the plurality of physical functions corresponds to a different one of the plurality of virtual memory controllers, and presents the plurality of physical functions to a host computing system over a peripheral component interconnect express (PCIe) interface.

20 Claims, 7 Drawing Sheets

Related U.S. Application Data

(60) Provisional application No. 62/713,411, filed on Aug. 1, 2018.

(52) U.S. Cl.
CPC ........ *G06F 3/0688* (2013.01); *G06F 13/1668* (2013.01); *G06F 13/4282* (2013.01); *G06F 2213/0024* (2013.01)

(58) Field of Classification Search
CPC .. G06F 3/0658; G06F 3/0664; G06F 13/1668; G06F 13/4282; G06F 2213/0024; G06F 2213/0026; G06F 9/45504; G06N 20/00
See application file for complete search history.

(56) References Cited

U.S. PATENT DOCUMENTS

| | | |
|---|---|---|
| 2013/0305246 A1 | 11/2013 | Goggin et al. |
| 2014/0281040 A1 | 9/2014 | Liu |
| 2015/0082305 A1 | 3/2015 | Hepkin et al. |
| 2015/0169341 A1 | 6/2015 | Gulati et al. |
| 2015/0317088 A1 | 11/2015 | Hussain et al. |
| 2016/0098372 A1 | 4/2016 | Boyle et al. |
| 2016/0378353 A1* | 12/2016 | Schmisseur .......... G06F 3/0604 711/114 |
| 2019/0339888 A1 | 11/2019 | Sasidharan et al. |
| 2020/0004445 A1 | 1/2020 | Benisty |

OTHER PUBLICATIONS

International Search Report and Written Opinion for International Application No. PCT/US2019/044513, dated Nov. 15, 2019, 13 pages.

Y. Dong, X. Yang, X.Li, J. Li, K. Tian, and H. Guan, "High Performance Network Virtualization with SR-IOV", HPCA—16 2010 The Sixteenth International Symposium on High-Performace Computer Architecture, Bangalore, 2010, pp. 1-1, koi:10.1109/HPCA.2010.5416637. (Year: 2010).

Korean Office Action for Patent Application No. 10-2021-7004837, dated Aug. 17, 2022, 11 pages.

* cited by examiner

NVME DIRECT VIRTUALIZATION WITH CONFIGURABLE STORAGE

RELATED APPLICATIONS

This application is a continuation of U.S. patent application Ser. No. 16/355,271, filed Mar. 15, 2019, which claims the benefit of U.S. Provisional Patent Application No. 62/713,411, filed on Aug. 1, 2018, the entire contents of each of which are hereby incorporated by reference herein.

TECHNICAL FIELD

The present disclosure generally relates to a memory system, and more specifically, relates to NVMe direct virtualization with configurable storage.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
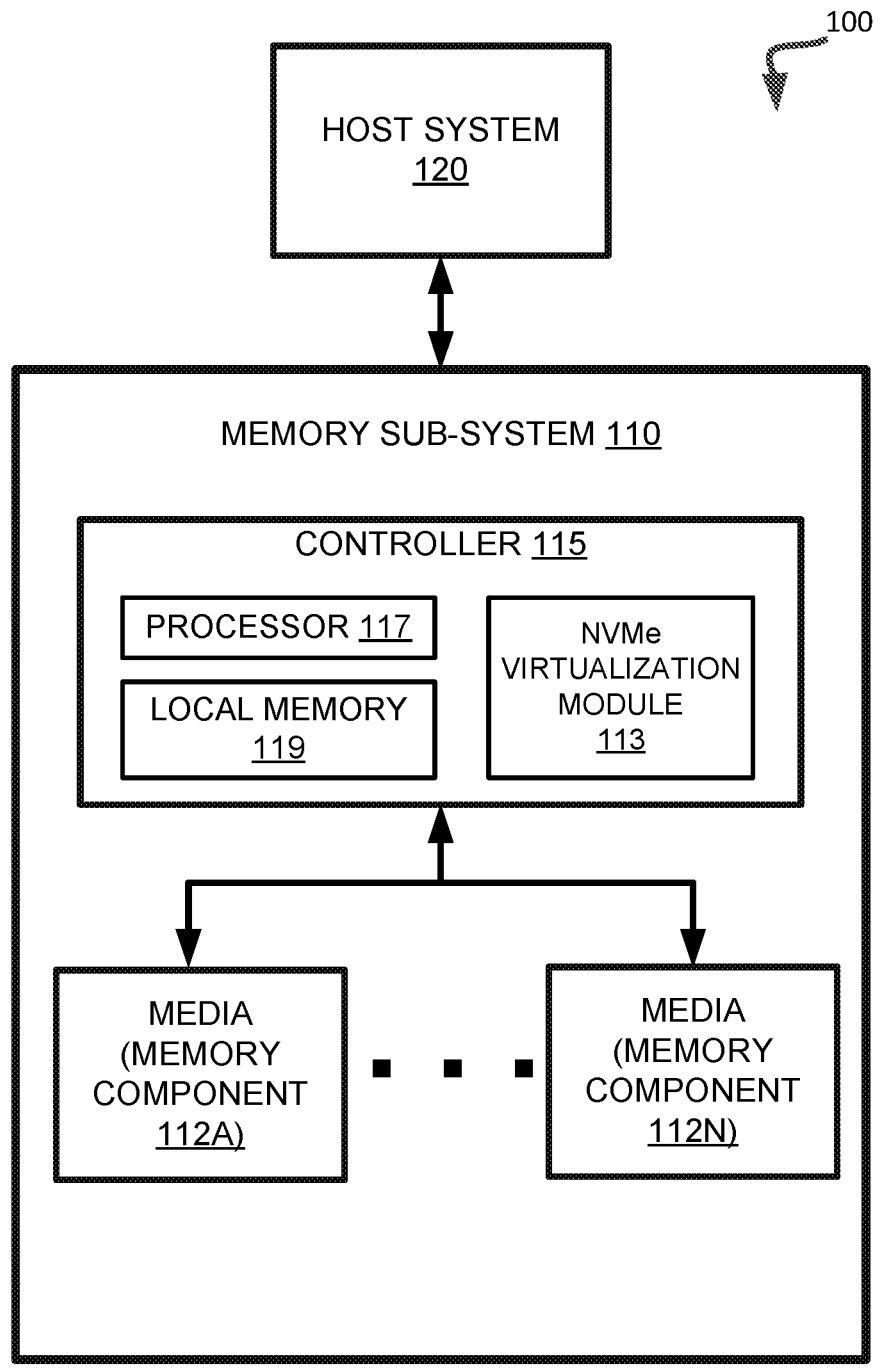
FIG. 1 illustrates an example computing environment for NVMe direct virtualization in accordance with some embodiments of the present disclosure.

Aspects of the present disclosure are directed to non-volatile memory express (NVMe) direct virtualization with configurable storage in a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

Certain conventional memory-subsystems utilize the single root input/output virtualization (SR-IOV) specification. SR-IOV is a specification that allows the isolation of peripheral component interconnect (PCI) Express (PCIe) resources among various hardware functions for manageability and performance reasons, while also allowing single physical PCIe devices to be shared in a virtual environment. SR-IOV offers different virtual functions to different virtual components (e.g., a network adapter) on a physical server machine. SR-IOV also allows different virtual machines in a virtual environment to share a single PCIe hardware interface. A physical function allows enumeration of a number of virtual functions and a hypervisor can then assign those virtual functions to one or more virtual machines. This solution requires two sets of drivers, including a physical function driver to enumerate the virtual functions, and the kernel needs to support a complete SR-IOV capable stack, and then the virtual functions require another driver that only can run the virtual functions. In addition, most hypervisor environments do not support SR-IOV, making that solution inapplicable to many situations.

Aspects of the present disclosure address the above and other deficiencies by having a memory sub-system that uses a non-volatile memory express (NVMe) virtualization schema to allow cloud computing services which do not natively support SR-My to be dynamically configured. This solution provides physical functions that are naturally visible to a host operating system or virtual machines running thereon, and does not rely on software translation performed by the hypervisor and PCIe. In one implementation, firmware or other logic, such as a NVMe virtualization module in the memory sub-system generates a number of virtual NVMe controllers. Each virtual NVMe controller is assigned a segment, slice, portion, etc. of an underlying physical non-volatile storage device. Each virtual NVMe controller also has a corresponding PCIe physical function, causing each virtual NVMe controller to appear as a separately addressable PCIe device (i.e., a physical controller) connected to the PCIe bus between the memory sub-system and the host system. Thus, there may be only a single underlying storage device in the memory sub-system that appears, by virtue of the multiple virtual NVMe controllers, as multiple individual storage devices to the host system connected via the PCIe bus. In another embodiment, there may be multiple underlying storage devices in the memory sub-system that are presented as some greater number of storage devices, represented by the virtual NVMe controllers.

The NVMe virtualization techniques described herein allow a memory sub-system connected to a PCIe bus that would normally appear as a single PCIe device to present itself as multiple separately addressable PCIe devices. The use of virtual NVMe controllers, each having a corresponding physical function, eliminates the need for additional physical controllers in the memory sub-system and the additional hardware resources that would normally be associated with such physical controllers. In addition, NVMe virtualization allows for the performance associated with the SR-IOV specification, including the ability for different virtual machines in a host system to share a single PCIe interface with the memory sub-system, in environments that do not natively support SR-IOV. Thus, instead of a PCIe root complex in the host system performing virtualization, the memory sub-system itself can implement the virtualization without the need for a hypervisor or other software involvement from the host system. The host system sees each physical function as a separate physical storage device which can be assigned to the host operating system or one of multiple virtual machines running thereon. In this manner, a single underlying storage resource can be shared by multiple entities on the host in a completely transparent fashion. Additional details of these NVMe virtualization techniques are provided below with respect to FIGS. 1-7.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data. The data blocks can be further grouped into one or more planes on each of memory components 112A to 112N, where operations can be performed on each of the planes concurrently. Corresponding data blocks from different planes can be associated with one another in a stripe than spans across multiple planes.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a NVMe virtualization module 113 that can be used to perform NVMe direct virtualization. In one embodiment, the NVMe virtualization module 113 executes firmware or other logic to provide a number of virtual NVMe controllers in memory sub-system 110. NVMe virtualization module 113 associates each virtual NVMe controller with a certain portion of the underlying memory components 112A to 112N, where each portion is addressable by a unique namespace. NVMe virtualization module 113 further assigns a corresponding PCIe physical function to each virtual NVMe controller, causing each virtual NVMe controller to appear as a separately addressable PCIe device (i.e., a physical controller) connected to the PCIe bus between the memory sub-system 110 and the host system 120. Host system 120, including separate virtual machines or partitions running thereon, can thus access each portion of the memory components 112A to 112N represented by a virtual NVMe controller separately and in parallel over the physical host interface (e.g., PCIe bus). Further details with regards to the operations of NVMe virtualization module 113 are described below.

Figure 2:
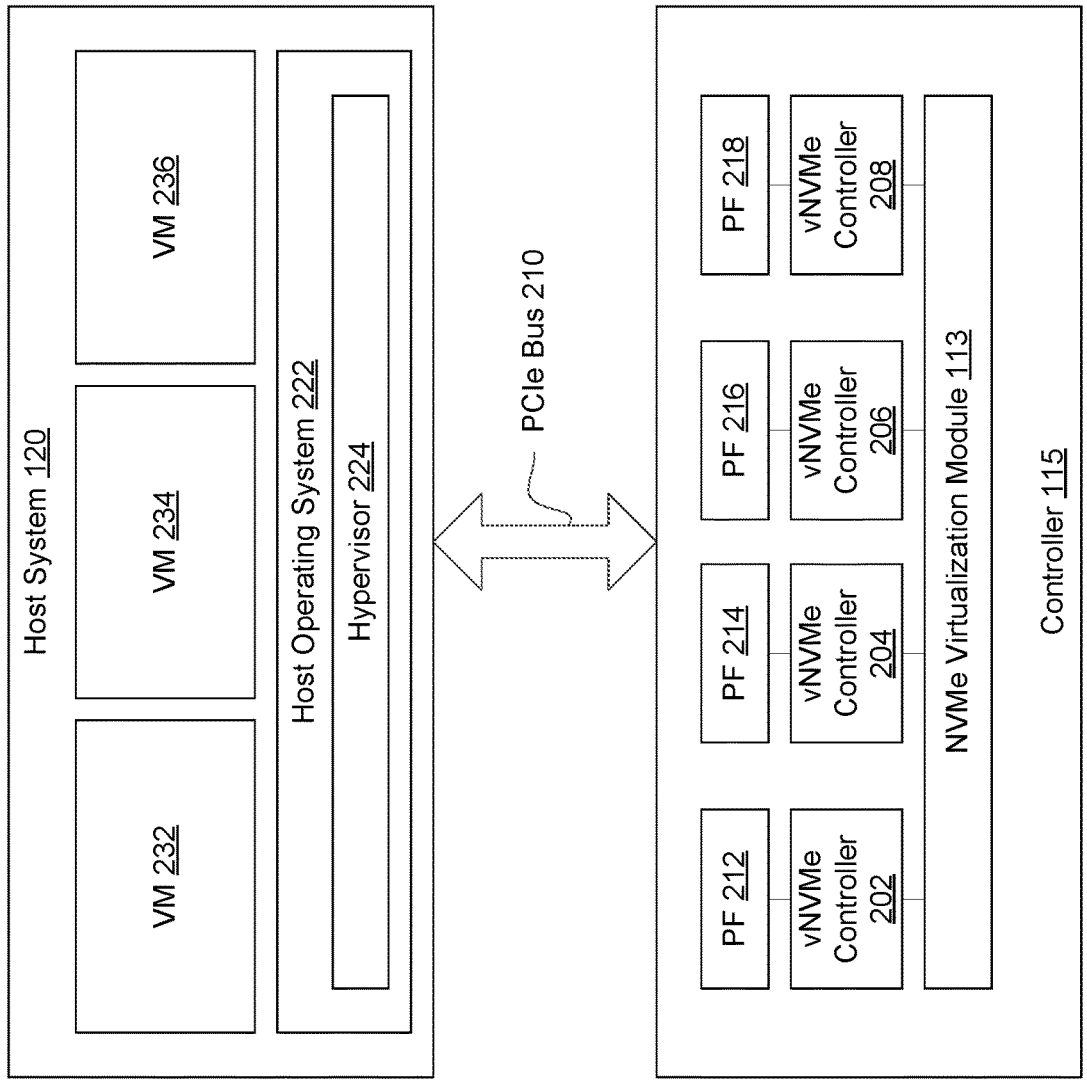
FIG. 2 illustrates an example physical host interface between a host system and a memory sub-system implementing NVMe direct virtualization in accordance with some embodiments of the present disclosure.

FIG. 2 illustrates an example physical host interface between a host system and a memory sub-system implementing NVMe direct virtualization in accordance with some embodiments of the present disclosure. In one embodiment, the controller 115 of memory sub-system 110 is connected to host system 120 over a physical host interface, such as PCIe bus 210. In one embodiment, the NVMe virtualization module 113 running on controller 115 generates and manages a number of virtual NVMe controllers 202-208 within controller 115. The virtual NVMe controllers 202-208 are virtual entities that appear as physical controllers to other devices, such as host system 120, connected to PCIe bus 210 by virtue of a physical function 212-218 associated with each virtual NVMe controller 202-208. FIG. 2 illustrates four virtual NVMe controllers 202-208 and four corresponding physical functions 212-218. In other embodiments, however, there may be any other number of NVMe controllers, each having a corresponding physical function. All of the virtual NVMe controllers 202-208 have the same priority and same functionality. Thus, there is no primary or secondary controller concept in contrast to SR-TOV, where a primary controller can create secondary controllers when the primary controller is in an operational state. This means that at the boot time, an SR-IOV system will not see any secondary controllers until the primary controller driver creates them.

Each of virtual NVMe controllers 202-208 manages storage access operations for the corresponding portion of the underlying memory components 112A to 112N, with which it is associated. For example, virtual NVMe controller 202 may receive data access requests from host system 120 over PCIe bus 210, including requests to read, write, or erase data in a first portion of memory component 112A. In response to the request, virtual NVMe controller 202 may perform the requested memory access operation on the data stored at an identified address in the first portion and return requested data and/or a confirmation or error message to the host system 120, as appropriate. Virtual NVMe controllers 204-208 may function in the same or similar fashion with respect to data access requests for their own corresponding portions of memory components 112A to 112N.

As described above, NVMe virtualization module 113 associates one of physical functions 212-218 with each of virtual NVMe controllers 202-208 in order to allow each virtual NVMe controller 202-208 to appear as a physical controller on PCIe bus 210. For example, physical function 212 may correspond to virtual NVMe controller 202, physical function 214 may correspond to virtual NVMe controller 204, physical function 216 may correspond to virtual NVMe controller 206, and physical function 218 may correspond to virtual NVMe controller 208. Physical functions 212-218 are fully featured PCIe functions that can be discovered, managed, and manipulated like any other PCIe device, and thus can be used to configure and control a PCIe device (e.g., virtual NVMe controllers 202-208). Each physical function 212-218 can have some number virtual functions associated with therewith. The virtual functions are lightweight PCIe functions that share one or more resources with the physical function and with virtual functions that are associated with that physical function. Each virtual function has a PCI memory space, which is used to map its register set. The virtual function device drivers operate on the register set to enable its functionality and the virtual function appears as an actual PCIe device, accessible by host system 120 over PCIe bus 210.

As noted above, each physical function 212-218 can be assigned to any one of virtual machines 232-236 in the host system 120. When I/O data is received at a virtual NVMe controller 202-208 from a virtual machine 232-236, a virtual machine driver provides a guest physical address for a corresponding read/write command. NVMe virtualization module 113 translates the physical function number to a bus, device, and function (BDF) number and then adds the command to a direct memory access (DMA) operation to perform the DMA operation on the guest physical address. In one embodiment, controller 115 further transforms the guest physical address to a system physical address for the memory sub-system 110.

Furthermore, each physical function 212-218 may be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QoS) provisioning, firmware and controller updates, vendor unique statistics and events, diagnostics, secure erase/encryption, among others. Typically, a first physical function can implement a privileged mode and the remainder of the physical functions can implement a normal mode. In other embodiments, however, any of the physical functions can be configured to operate in the privileged mode. Accordingly, there can be one or more functions that run in the privileged mode.

Host system 120 runs multiple virtual machines 232, 234, 236, by executing a software layer 224, often referred to as "hypervisor," above the hardware and below the virtual machines, as schematically shown in FIG. 2. In one illustrative example, the hypervisor 224 may be a component of a host operating system 222 executed by the host system 120. Alternatively, the hypervisor 224 may be provided by an application running under the host operating system 222, or may run directly on the host system 120 without an operating system beneath it. The hypervisor 224 may abstract the physical layer, including processors, memory, and I/O devices, and present this abstraction to virtual machines 232, 234, 236 as virtual devices, including virtual processors, virtual memory, and virtual I/O devices. Virtual machines 232, 234, 236 may each execute a guest operating system which may utilize the underlying virtual devices, which may, for example, map to a portion of the memory components 112A to 112N managed by one of virtual NVMe controllers 202-208 in memory sub-system 110. One or more applications may be running on each virtual machine under the guest operating system.

Each virtual machine 232, 234, 236 may include one or more virtual processors. Processor virtualization may be implemented by the hypervisor 224 scheduling time slots on one or more physical processors such that from the guest operating system's perspective, those time slots are scheduled on a virtual processor. Memory virtualization may be implemented by a page table (PT) which is a memory structure translating guest memory addresses to physical memory addresses. The hypervisor 224 may run at a higher privilege level than the guest operating systems, and the latter may run at a higher privilege level than the guest applications.

In one implementation, there may be multiple partitions on host system 120 representing virtual machines 232, 234, 236. A parent partition corresponding to virtual machine 232 is the root partition (i.e., root ring 0) that has additional privileges to control the life cycle of other child partitions (i.e., conventional ring 0), corresponding, for example, to virtual machines 234 and 236. Each partition has corresponding virtual memory, and instead of presenting a virtual device, the child partitions see a physical device being assigned to them. When host system 120 initially boots up, the parent partition can see all of the physical devices directly. The pass through mechanism (e.g., PCIe Pass-Through or Direct Device Assignment) allows the parent partition to assign an NVMe device (e.g., one of virtual NVMe controllers 202-208) to the child partitions. The associated virtual NVMe controllers 202-208 may appear as a virtual storage resource to each of virtual machines 232, 234, 236, which the guest operating system or guest applications running therein can access. In one embodiment, for example, virtual machine 232 is associated with virtual NVMe controller 202, virtual machine 234 is associated with virtual NVMe controller 204, and virtual machine 236 is associated with virtual NVMe controller 206. In other embodiments, one virtual machine may be associated with two or more virtual NVMe controllers. The virtual machines 232, 234, 236, can identify the associated virtual NVMe controllers using a corresponding bus, device, and function (BDF) number, as will be described in more detail below.

In one embodiment, NVMe virtualization module 113 further implements access control services for each of virtual NVMe controllers 202-208. The access control services manage what devices have access permissions for the virtual NVMe controllers 202-208. The access permissions may define, for example, which of virtual machines 232-236 on host system 120 can access each of virtual NVMe controllers 202-208, as well as what operations each of virtual machines 232-236 can perform on each of virtual NVMe controllers 202-208. In one embodiment, NVMe virtualization module 113 controls access permissions for each of virtual NVMe controllers 202-208 individually. For example, in the privileged mode, NVMe virtualization module 113 may grant virtual machine 232 permission to read and write data using virtual NVMe controller 202, but only permission to read data using virtual NVMe controller 204. Similarly, in the privileged mode, NVMe virtualization module 113 may grant virtual machine 232 permission to read and write data using virtual NVMe controller 204 only. Any combination of access permissions may be defined for virtual NVMe controllers 202. When a memory access request is received for one of virtual NVMe controllers 202-208, NVMe virtualization module 113 may analyze the conditions of the request (e.g., requestor, target, operation, requested data address, etc.) based on access policies defining the access control services. The access policies may be stored in local memory 119, for example. If the request satisfies the corresponding access policy (the conditions of the request match conditions specified in the corresponding access policy), NVMe virtualization module 113 may grant the access request. Otherwise, the request may be denied.

Figure 3:
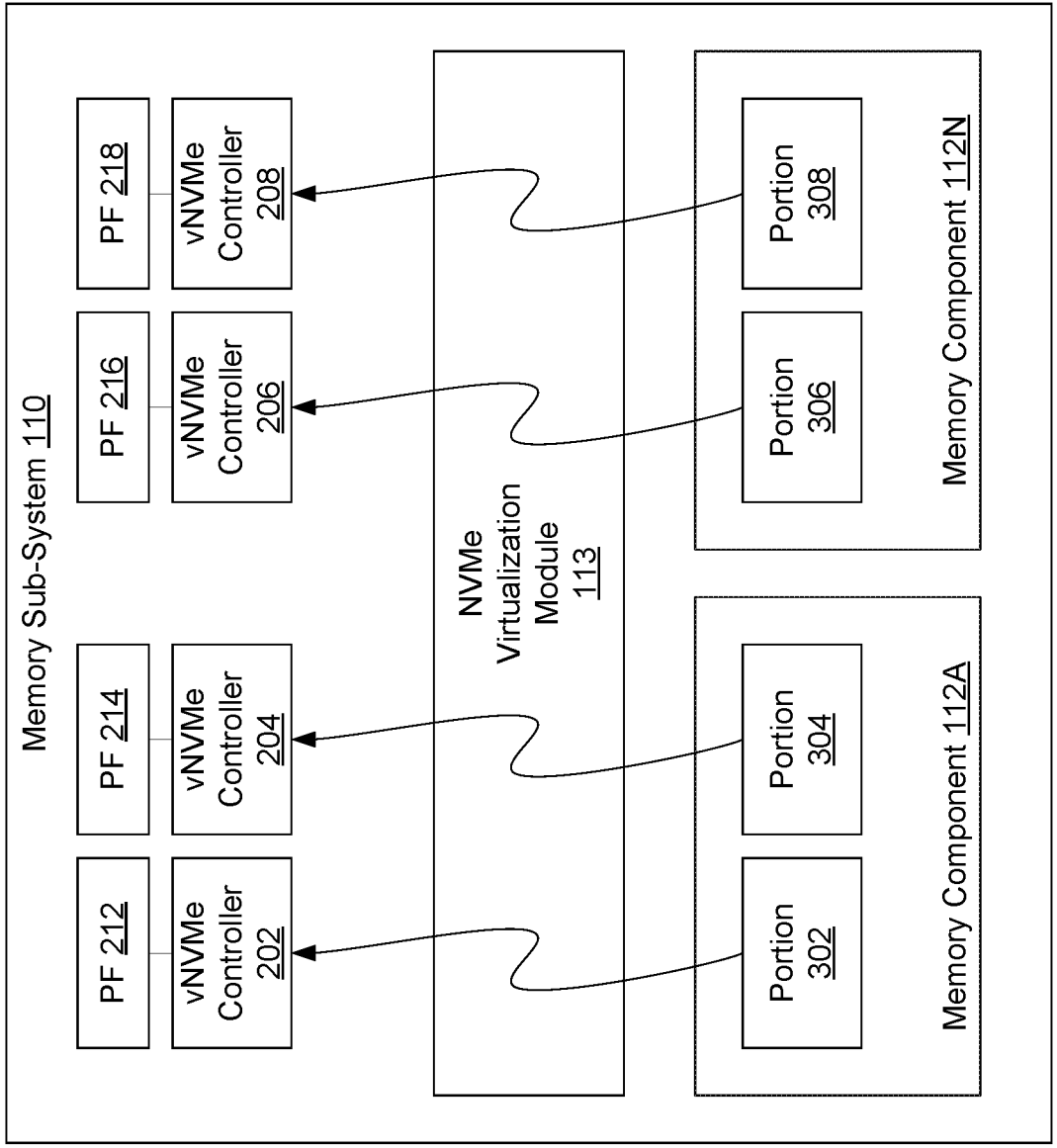
FIG. 3 illustrates memory portion mapping in memory sub-system for NVMe direct virtualization in accordance with some embodiments of the present disclosure.

FIG. 3 illustrates memory portion mapping in memory sub-system for NVMe direct virtualization in accordance with some embodiments of the present disclosure. As described above, NVMe virtualization module 113 maps each NVMe controller in the memory sub-system 110 to a corresponding portion of one of memory components 112A to 112N. As illustrated in FIG. 3, virtual NVMe controller 202 is mapped to portion 302 of memory component 112A, virtual NVMe controller 204 is mapped to portion 304 of memory component 112A, virtual NVMe controller 206 is mapped to portion 306 of memory component 112N, and virtual NVMe controller 208 is mapped to portion 308 of memory component 112N. In other embodiments, the respective portions may span two or more of memory components 112A to 112N. Each portion 302-308 may have a fixed size or may have a different size. For example, portion 302 could be larger than portion 304, which may be larger than portion 306, which may be the same size as portion 308. In one embodiment, each portion 302-308 is represented by a unique namespace. The namespace is a quantity of one or more memory components 112A to 112N that can be formatted into logical blocks when memory components are configured with the NVMe protocol. The NVMe protocol provides access to the namespace, which appears as a standard-block device on which file systems and applications can be deployed without any modification. Each virtual NVMe controller 202-208 may have one or more separate namespaces, each identified by a unique namespace ID (NSID). In addition, there may be one or more shared namespaces, comprising multiple portions 302-308 that are accessible by two or more of virtual NVMe controllers 202-208.

In addition, to having a portion 302-308 of memory assigned, each virtual NVMe controller 202-208 may also have an associated number of queue pairs. NVMe virtualization module 113 may have a fixed number of input/output (I/O) queue pairs and admin queue pairs which can be distributed among virtual NVMe controllers 202-208. The I/O queue pairs are used to receive memory access requests from host system 120 and the admin queue pairs are used to receive administrative commands. The number of I/O queue pairs assigned to each virtual NVMe controller 202-208 controls how many concurrent memory access requests can be received at the corresponding virtual NVMe controller. For example, if virtual NVMe controller 202 is assigned ten I/O queue pairs, virtual NVMe controller 202 can receive up to ten memory access requests from host system 120 before a subsequent request is denied. The memory access requests are held in the associated I/O queue pairs while a current request is being processed. Once virtual NVMe controller 202 has completed processing of the current request, a next request can be retrieved from the associated I/O queue pairs for processing, and another memory access request can be added to the queue. In one embodiment, NVMe virtualization module distributes the available I/O queue pairs evenly among virtual NVMe controllers 202-208. In another embodiment, the number of I/O queue pairs assigned to each virtual NVMe controller is not equal among different virtual NVMe controllers 202-208 and is based on some other factor, such as the size of the corresponding memory portion 302-308, the level of past activity on the virtual NVMe controller, etc. In any embodiment, each virtual NVMe controller is assigned at least one admin queue pair.

Figure 4:
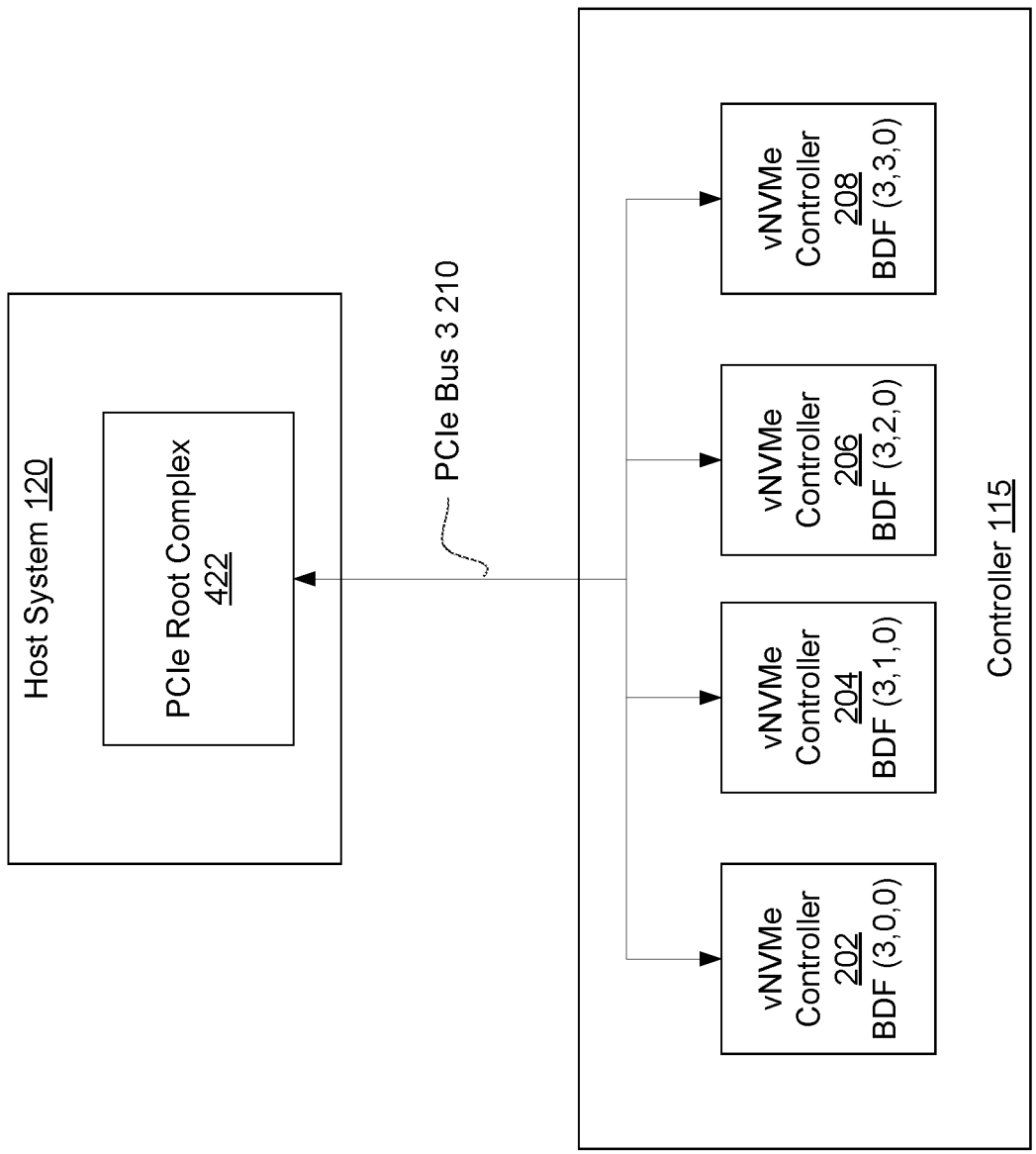
FIG. 4 illustrates a device hierarchy and topology for a memory sub-system with NVMe direct virtualization in accordance with some embodiments of the present disclosure.

FIG. 4 illustrates a device hierarchy and topology for a memory sub-system with NVMe direct virtualization in accordance with some embodiments of the present disclosure. In one embodiment, host system 120 include PCIe root complex 422 which serves as a connection between the physical and virtual components of host system 120 and the PCIe bus 210. PCIe root complex 422 can generate transaction requests on behalf of a processing device, such a virtual processing device in one of virtual machines 232, 234, 236. Depending on the embodiment, PCIe root complex 422 may be implemented as a discrete device or may be integrated with a physical processing device in host system 120. PCIe root complex 422 may have a number of communication ports such that PCIe root complex 422 can send and receive commands to/from multiple PCIe devices, such as virtual NVMe controllers 202-208 connected to PCIe bus 210.

As described above, each of virtual NVMe controllers 202-208 appears as a separate physical PCIe device connected to PCIe bus 210 by virtue of each having a separate physical function. Each physical function provides a corresponding configuration space for the corresponding one of virtual NVMe controllers 202-208. In one embodiment, each configuration space is 256 bytes long, and is addressable by knowing a corresponding bus, device, and function (BDF) number. The BDF number may include an eight-bit value indicating the PCIe bus, a five-bit value indicating the corresponding device, and three-bit value indicating the associated function. Thus, up to 256 buses, each with up to 32 devices, each supporting eight functions can be uniquely identified. In one embodiment, an alternative routing interpretation (ARI) may be used to increase the number of physical functions that can be implemented in a device up to 256 from the normal maximum of eight. In the example illustrated in FIG. 4, PCIe bus 210 is given a value of 3, and thus the BDF number of each of virtual NVMe controllers 202-208 includes the value of 3. In addition, each of virtual NVMe controllers 202-208 has a unique device value (in this case 0, 1, 2, and 3, respectively). Furthermore, since each of virtual NVMe controllers 202-208 has only a single physical function, each has a function value of 0. This results in each of virtual NVMe controllers 202-208 having a unique BDF number which PCIe root complex 422 can use to address the desired virtual NVMe controller. In one embodiment, controller 115 maintains a table or other data structure that maps each virtual NVMe controller's physical function number to a unique BDF. In addition, each physical function can create its own namespace (e.g., volume) with a namespace identifier (NSID). These NSIDs can start from 0 to N−1 for each function. The NSIDs may be unique across the memory sub-system 110, and in one embodiment, the physical function number is appended to the most significant bit of each NSID.

Figure 5:
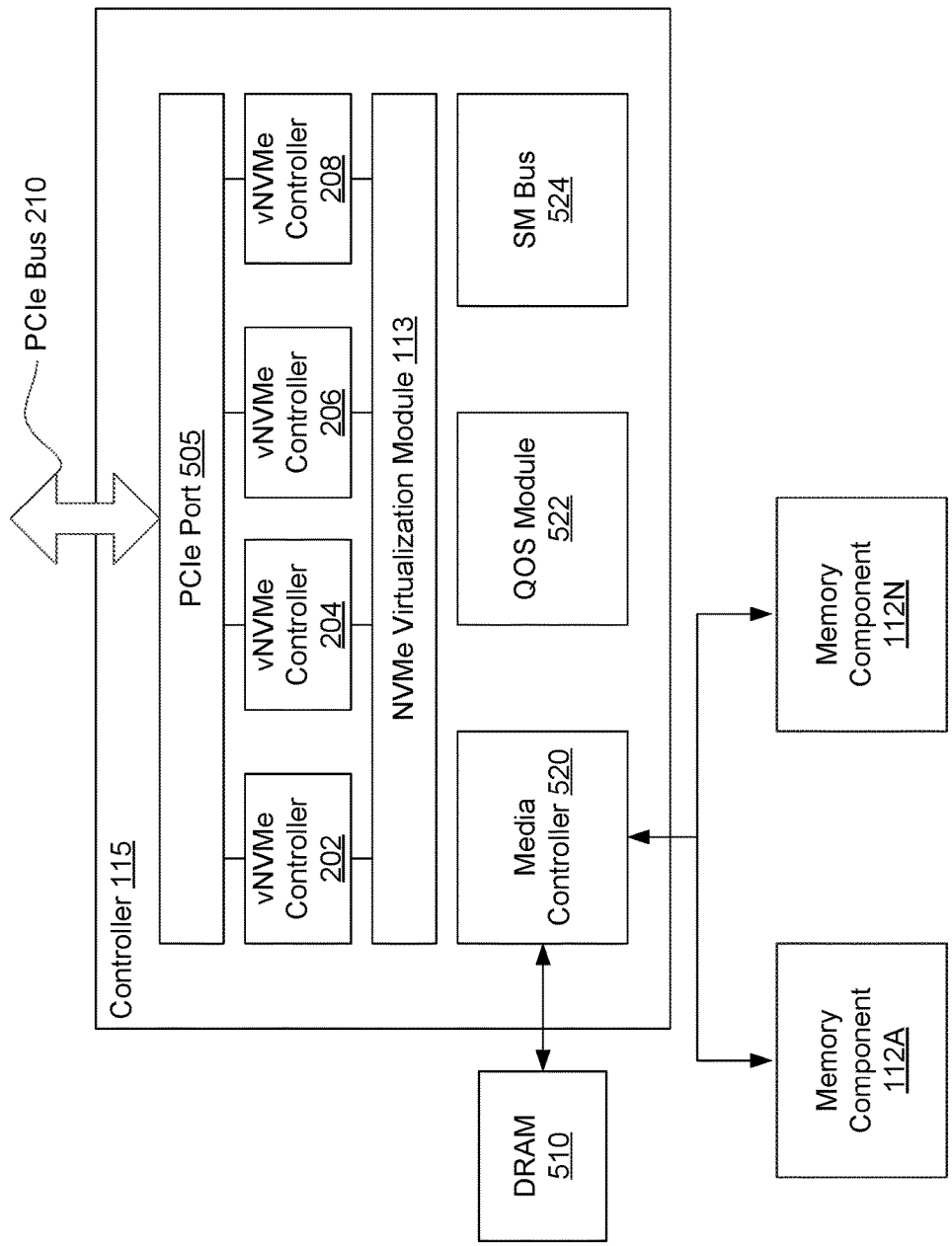
FIG. 5 illustrates a physical controller implementing NVMe direct virtualization in accordance with some embodiments of the present disclosure.

FIG. 5 illustrates a physical controller implementing NVMe direct virtualization in accordance with some embodiments of the present disclosure. As described above, controller 115 includes NVMe virtualization module 113 and virtual NVMe controllers 202-208. Virtual NVMe controllers 202-208 are coupled to PCIe port 505 which enables communications with host system 120 across PCIe bus 210. In one embodiment, controller 115 further includes media controller 520. Media controller 520 manages operations of storage media in the memory sub-system 110 including memory components 112A to 112N and optionally volatile memory, such as one or more dynamic random access memory (DRAM) devices 510. When one of virtual NVMe controllers 202-208 receives a request to access data in one of memory components 112A to 112N, for example, the virtual NVMe controller provides the request to media controller 520 which retrieves and returns the requested data, writes the requested data or erases the requested data from the memory components 112A to 112N.

In one embodiment, controller 115 further includes quality of service (QoS) module 522 and sideband management (SM) bus 524. QoS can implement individual quality of service management for each virtual NVMe controller 202-208. When a large storage device, such as one of memory components 112A to 112N is sliced into smaller partitions, each controlled by a virtual NVMe controller 202-208, and that can each be used by different clients (e.g., virtual machines on host system 120), it may be beneficial to associate QoS characteristics with each individual partition. To meet these requirements, QoS module 522 attaches QoS controls to each virtual NVMe controller 202-208. The QoS controls may include, for example, an individual storage partition size, bandwidth, or other characteristics. QoS module 522 may monitor the performance of virtual NVMe controllers 202-208 over time and may reconfigure resource assignments as needed to ensure compliance with the QoS requirements.

SM bus 524 communicates with a platform manager (not shown), such as a baseboard management controller (BMC) in memory sub-system 110 to interface with platform hardware. The platform manager may interface with different types of sensors built into memory sub-system 110 to report on parameters, such as temperature, cooling fan speeds, power status, operating system status, etc. The platform manager monitors these sensors and can generate alerts if any of the parameters do not stay within certain pre-set limits, indicating a potential failure. Controller 115 may receive these alerts from the platform manager and/or provide status information to platform manager via SM bus 524.

Figure 6:
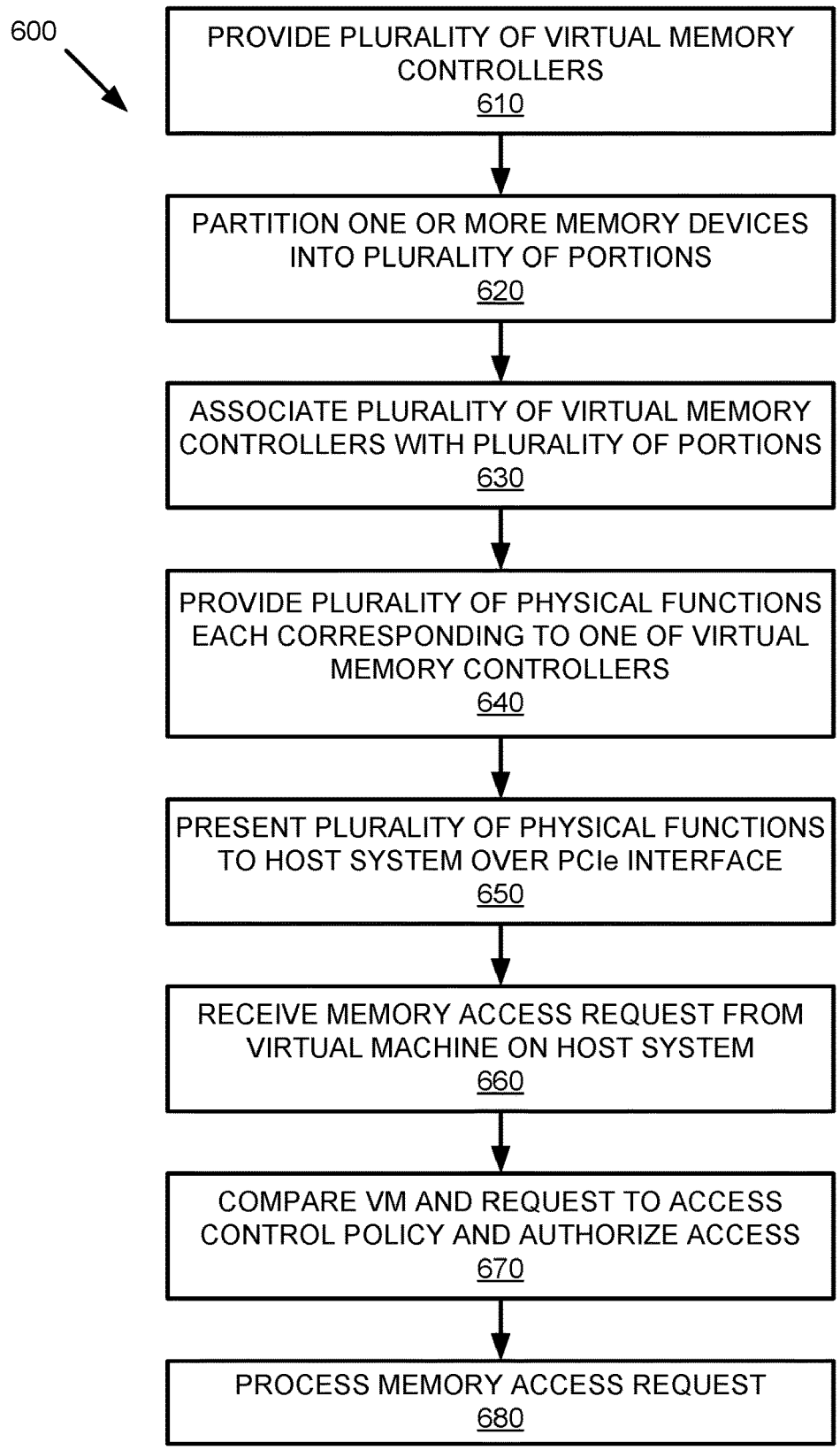
FIG. 6 illustrates a method of NVMe direct virtualization in a memory sub-system in accordance with some embodiments of the present disclosure.

FIG. 6 is a flow diagram of an example method of NVMe direct virtualization in a memory sub-system in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by NVMe virtualization module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing device provides a plurality of virtual memory controllers, such as virtual NVMe controllers 202-208. The virtual NVMe controllers 202-208 are virtual entities that appear as physical controllers to other devices, such as host system 120, connected to PCIe bus 210 by virtue of a physical function 212-218 associated with each virtual NVMe controller 202-208. In one embodiment, the virtual memory controllers are created inside controller 115, but may not be used until they are enabled, such as in response to input received from a system administrator via a management interface.

At operation 620, the processing device partitions one or more memory devices, such as memory components 112A to 112N, into a plurality of portions 320-308, and at operation 630, the processing device associates each of the plurality of virtual memory controllers, such as virtual NVMe controllers 202-208, with one of the plurality of portions 302-308. In one embodiment, NVMe virtualization module 113 maps each NVMe controller in the memory sub-system 110 to a corresponding portion of one of memory components 112A to 112N. In other embodiments, the respective portions may span two or more of memory components 112A to 112N, and each portion 302-308 may have a fixed or different size.

At operation 640, the processing device provides a plurality of physical functions 212-218, wherein each of the plurality of physical functions 212-218 corresponds to a different one of the plurality of virtual memory controllers, such as virtual NVMe controllers 202-208. Each of the plurality of physical functions 212-218 represents a corresponding one of the plurality of virtual memory controllers as a physical memory controller to the host system 120 on a peripheral component interconnect express (PCIe) interface, such as PCIe bus 210. In one embodiment, the plurality of physical functions 212-218 are created in response to input received from the system administrator via the management interface.

At operation 650, the processing device presents the plurality of physical functions 212-218 to a host computing system, such as host system 120, over the PCIe interface, such as PCIe bus 210. The host system 120 assigns each of the plurality of physical functions 212-218 to a different virtual machine, such as one of virtual machines 232, 234, 236, running on the host system 120. Each of the plurality of physical functions 212-218 provides a configuration space for a corresponding one of the plurality of virtual memory controllers, wherein each configuration space is addressable by knowing a unique bus, device, and function (BDF) number. In addition, a first physical function, such as physical function 212, of the plurality of physical functions 212-218 may be implemented in a privileged mode and be configured to perform management operations on a remainder of the plurality of physical functions (e.g., physical functions 214-218), which may be implemented in a normal mode.

At operation 660, the processing device receives memory access requests from an assigned virtual machine, such as one of virtual machines 232, 234, 236, running on the host system 120. The memory access requests may pertain to an associated portion, such as one of portions 302-308 of the one or more memory devices, such as memory components 112A to 112N.

At operation 670, the processing device compares the assigned virtual machine, such as one of virtual machines 232, 234, 236, and the memory access request to an access control policy associated with the plurality of virtual memory controllers, such as virtual NVMe controllers 202-208, and, responsive to the assigned virtual machine and the memory access request satisfying one or more conditions of the access control policy, authorize access to the plurality of virtual memory controllers.

At operation 680, the processing device processes the memory access requests. In one embodiment, one or more of virtual NVMe controllers 202-208 may perform the requested memory access operation, such as a read, write or erase operations, and may return requested data and/or a confirmation or error message to the host system 120, as appropriate.

Figure 7:
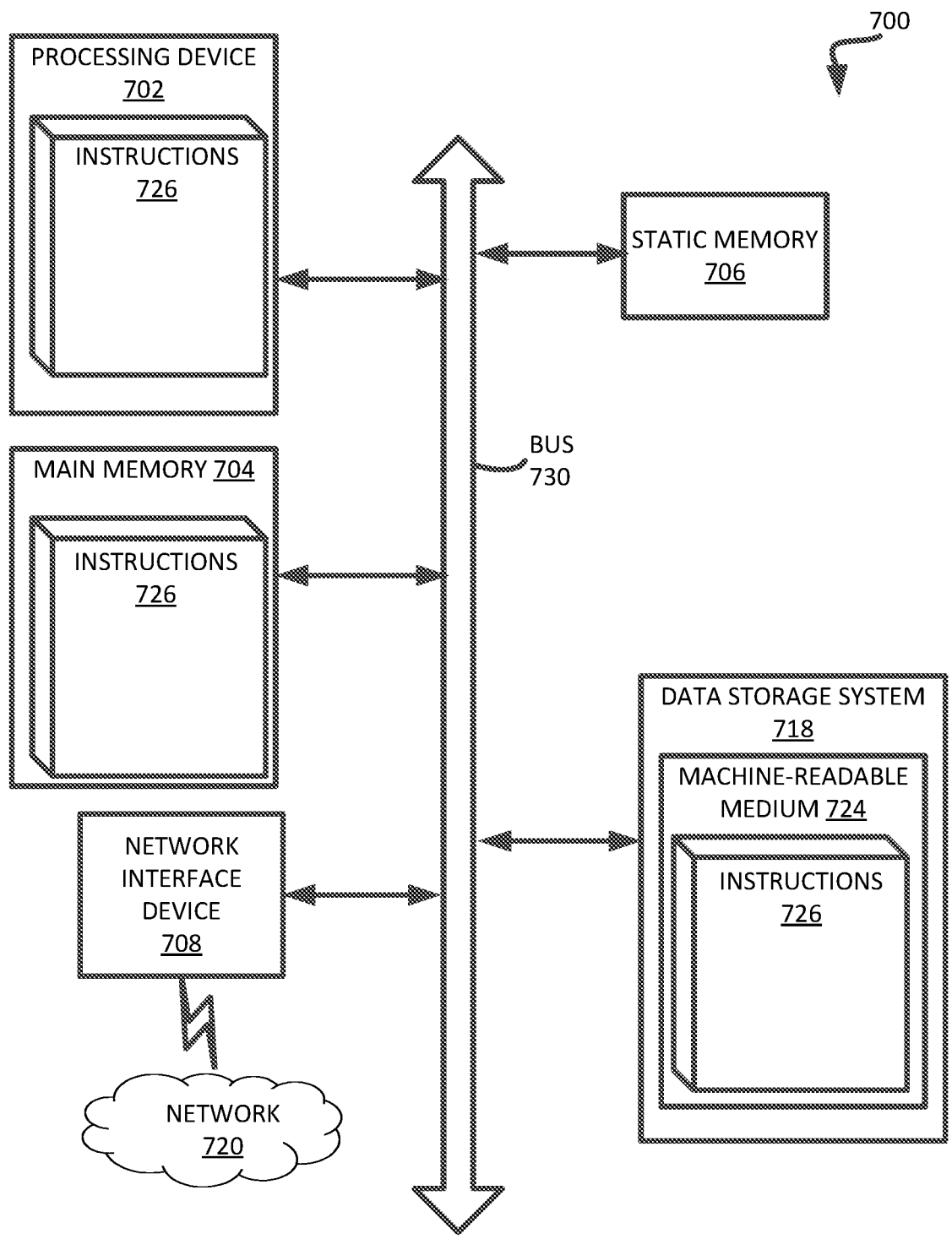
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the read window budget component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the NVMe virtualization module 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
one or more memory devices; and
a processing device, operatively coupled with the one or more memory devices, to perform operations comprising:
providing a plurality of virtual memory controllers;
providing a plurality of physical functions, wherein each of the plurality of physical functions corresponds to a different one of the plurality of virtual memory controllers;
partitioning the one or more memory devices into a plurality of physical partitions;

associating each of the plurality of virtual memory controllers with a respective one of the plurality of physical partitions and a respective one of the plurality of physical functions; and presenting the plurality of physical functions to a host computing system over a peripheral component interconnect express (PCIe) interface to provide access to the plurality of virtual memory controllers and the associated plurality of physical partitions.

2. The memory system of claim 1, wherein the processing device is to perform operations further comprising:

assigning each of the plurality of virtual memory controllers a respective number of input/output (I/O) queue pairs in the processing device to receive I/O commands from the host computing system, wherein each respective number of I/O queue pairs in the system controller corresponds to a characteristic of an associated one of the plurality of virtual memory controllers.

3. The memory system of claim 1, wherein each of the plurality of virtual memory controllers to receive and process memory access requests from an assigned virtual machine running on the host computing system, the memory access requests pertaining to an associated portion of the one or more memory devices.

4. The memory system of claim 3, wherein the processing device is to perform operations further comprising:

determining whether the assigned virtual machine and the memory access request satisfy one or more conditions of an access control policy associated with the plurality of virtual memory controllers; and responsive to the assigned virtual machine and the memory access request satisfying the one or more conditions of the access control policy, authorizing access to the plurality of virtual memory controllers.

5. The memory system of claim 1, wherein each of the plurality of physical functions represents a corresponding one of the plurality of virtual memory controllers as a physical memory controller to the host computing system on the PCIe interface.

6. The memory system of claim 1, wherein each of the plurality of physical functions provides a configuration space for a corresponding one of the plurality of virtual memory controllers, and wherein each configuration space is addressable by knowing a unique bus, device, and function (BDF) number.

7. The memory system of claim 1, wherein a first physical function of the plurality of physical functions is implemented in a privileged mode and is configured to perform management operations on a remainder of the plurality of physical functions implemented in a normal mode.

8. A method comprising:

providing a plurality of virtual memory controllers;

providing a plurality of physical functions, wherein each of the plurality of physical functions corresponds to a different one of the plurality of virtual memory controllers;

partitioning one or more memory devices into a plurality of physical partitions;

associating each of the plurality of virtual memory controllers with a respective one of the plurality of physical partitions and a respective one of the plurality of physical functions; and presenting the plurality of physical functions to a host computing system over a peripheral component interconnect express (PCIe) interface to provide access to the plurality of virtual memory controllers and the associated plurality of physical partitions.

9. The method of claim 8, further comprising:

assigning each of the plurality of virtual memory controllers a respective number of input/output (I/O) queue pairs to receive I/O commands from the host computing system, wherein each respective number of I/O queue pairs in the system controller corresponds to a characteristic of an associated one of the plurality of virtual memory controllers.

10. The method of claim 8, further comprising:

receiving and processing, by each of the plurality of virtual memory controllers, memory access requests from an assigned virtual machine running on the host computing system, the memory access requests pertaining to an associated portion of the one or more memory devices.

11. The method of claim 10, further comprising:

comparing the assigned virtual machine and the memory access request to an access control policy associated with the plurality of virtual memory controllers; and responsive to the assigned virtual machine and the memory access request satisfying one or more conditions of the access control policy, authorizing access to the plurality of virtual memory controllers.

12. The method of claim 8, wherein each of the plurality of physical functions represents a corresponding one of the plurality of virtual memory controllers as a physical memory controller to the host computing system on the PCIe interface.

13. The method of claim 8, wherein each of the plurality of physical functions provides a configuration space for a corresponding one of the plurality of virtual memory controllers, and wherein each configuration space is addressable by knowing a unique bus, device, and function (BDF) number.

14. The method of claim 8, wherein a first physical function of the plurality of physical functions is implemented in a privileged mode and is configured to perform management operations on a remainder of the plurality of physical functions implemented in a normal mode.

15. A non-transitory computer-readable storage medium comprising instructions that, when executed by a processing device, cause the processing device to perform operations comprising:

providing a plurality of virtual memory controllers;

providing a plurality of physical functions, wherein each of the plurality of physical functions corresponds to a different one of the plurality of virtual memory controllers;

partitioning one or more memory devices into a plurality of physical partitions;

associating each of the plurality of virtual memory controllers with a respective one of the plurality of physical partitions and a respective one of the plurality of physical functions; and presenting the plurality of physical functions to a host computing system over a peripheral component interconnect express (PCIe) interface to provide access to the plurality of virtual memory controllers and the associated plurality of physical partitions.

16. The non-transitory computer-readable storage medium of claim 15, wherein the instructions cause the processing device to perform operations further comprising:

assigning each of the plurality of virtual memory controllers a respective number of input/output (I/O) queue pairs in the processing device to receive I/O commands from the host computing system, wherein each respective number of I/O queue pairs in the system controller corresponds to a characteristic of an associated one of the plurality of virtual memory controllers.

17. The non-transitory computer-readable storage medium of claim 15, wherein the instructions cause the processing device to perform operations further comprising:

receiving and processing, by each of the plurality of virtual memory controllers, memory access requests from an assigned virtual machine running on the host computing system, the memory access requests pertaining to an associated portion of the one or more memory devices.

18. The non-transitory computer-readable storage medium of claim 17, wherein the instructions cause the processing device to perform operations further comprising:

comparing the assigned virtual machine and the memory access request to an access control policy associated with the plurality of virtual memory controllers; and responsive to the assigned virtual machine and the memory access request satisfying one or more conditions of the access control policy, authorizing access to the plurality of virtual memory controllers.

19. The non-transitory computer-readable storage medium of claim 15, wherein each of the plurality of physical functions represents a corresponding one of the plurality of virtual memory controllers as a physical memory controller to the host computing system on the PCIe interface.

20. The non-transitory computer-readable storage medium of claim 15, wherein each of the plurality of physical functions provides a configuration space for a corresponding one of the plurality of virtual memory controllers, and wherein each configuration space is addressable by knowing a unique bus, device, and function (BDF) number.

* * * * *